United States Patent [19]

Ebrahim

[11] Patent Number: 5,887,134
[45] Date of Patent: Mar. 23, 1999

[54] SYSTEM AND METHOD FOR PRESERVING MESSAGE ORDER WHILE EMPLOYING BOTH PROGRAMMED I/O AND DMA OPERATIONS

[75] Inventor: Zahir Ebrahim, Palo Alto, Calif.

[73] Assignee: Sun Microsystems, Mountain View, Calif.

[21] Appl. No.: 885,151

[22] Filed: Jun. 30, 1997

[51] Int. Cl.$^6$ .................................................. G06F 15/16
[52] U.S. Cl. ................................ 395/200.3; 395/200.53; 395/200.42; 395/842
[58] Field of Search ........................... 395/200.3, 200.53, 395/200.5

[56] References Cited

U.S. PATENT DOCUMENTS

| | | | |
|---|---|---|---|
| 4,371,932 | 2/1983 | Dinwiddie, Jr. et al. ................ | 395/841 |
| 4,654,654 | 3/1987 | Butler et al. .......................... | 340/825.5 |
| 4,766,534 | 8/1988 | DeBenedictis ....................... | 395/200.58 |
| 5,379,381 | 1/1995 | Lamb ..................................... | 395/826 |
| 5,790,530 | 8/1998 | Moh et al. .............................. | 370/363 |

OTHER PUBLICATIONS

Blumrich, Matthias A., et al.; "Virtual Memory Mapped Network Interface for the Shrimp Multicomputer", *In Proceedings of the 21st Annual Symposium on Computer Architecture*, Apr. 1994, pp. 142–153.

Blumrich, Matthias A., et al.; "Two Virtual Memory Mapped Network Interface Designs", *In the Hot Interconnects II Symposium Record*, Aug. 1994, pp. 134–142.

Blumrich, Matthias, A., et al.; "Virtual-Memory-Mapped Network Interfaces", *IEEE*, Feb. 1995, pp. 21–27.

Dubnicki, Cezary, et al.; "Software Support for Virtual Memory-Mapped Communication", *10th International Parallel Processing Symposium*, Apr. 1996.

*Primary Examiner*—Eric Coleman
*Assistant Examiner*—Mackly Monestime
*Attorney, Agent, or Firm*—Gary S. Williams; Flehr Hohbach Test Albritton & Herbert LLP

[57] ABSTRACT

In a cluster of computer nodes, each node has network interface and at least one processor. Transmission of a multipart message from a first node to a second node is initiated by sending to a network interface of the first node a sequence of PIO store and DMA store commands, each PIO store and DMA store command specifying a respective component of the multipart message to be stored in a respective specified memory mapped location in the second node, the sequence of the PIO store and DMA store commands corresponding to a predefined message component order. The first node's network interface packetizes the sequence of PIO and DMA commands to generate an ordered stream of data transfer packets whose order corresponds to the predefined message component order, and transmits the ordered stream of data transfer packets to the second node so as to store the respective components of the multipart message in their respective specified memory locations in the second node in the predefined message component order.

15 Claims, 7 Drawing Sheets

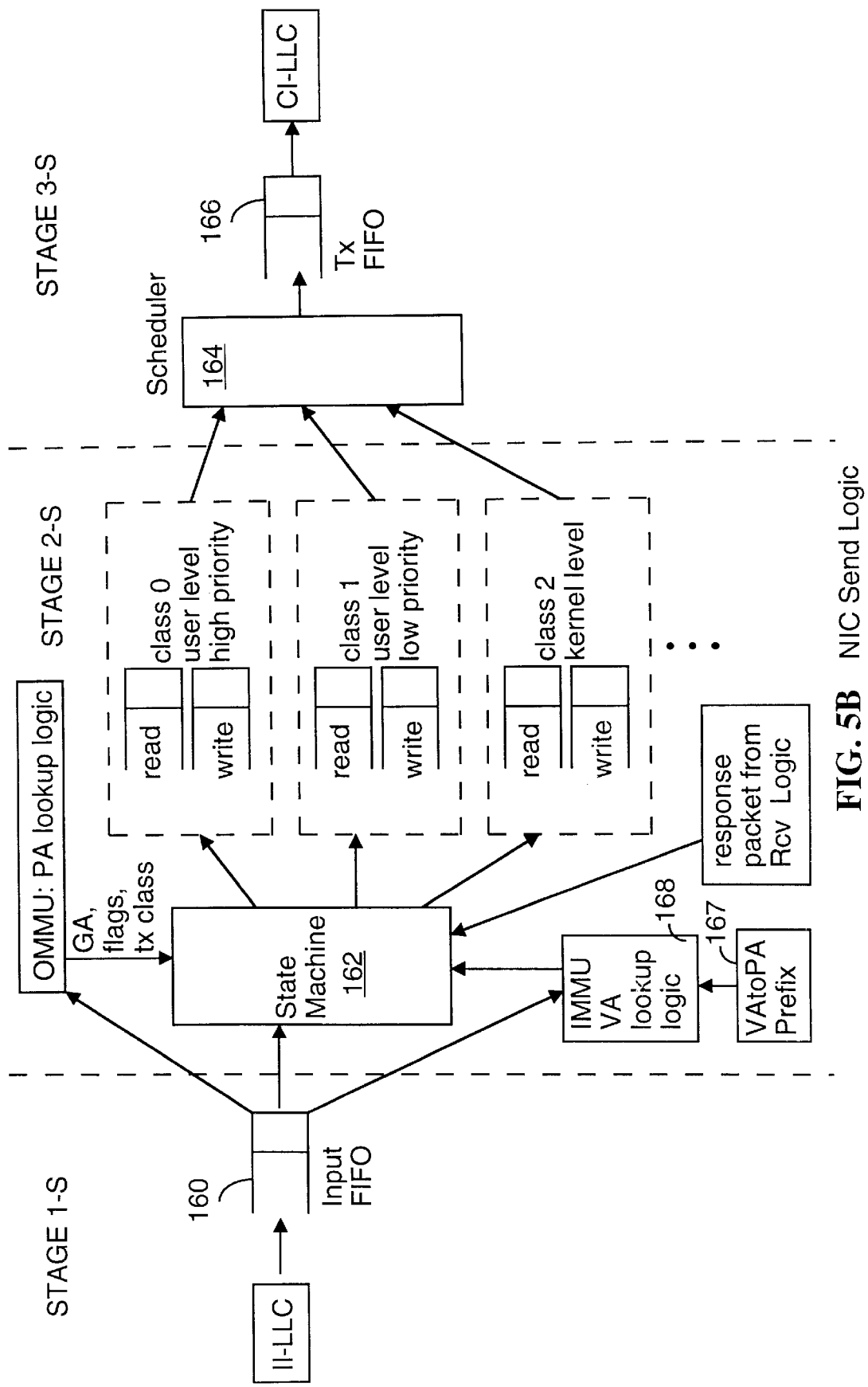
FIG. 5B  NIC Send Logic

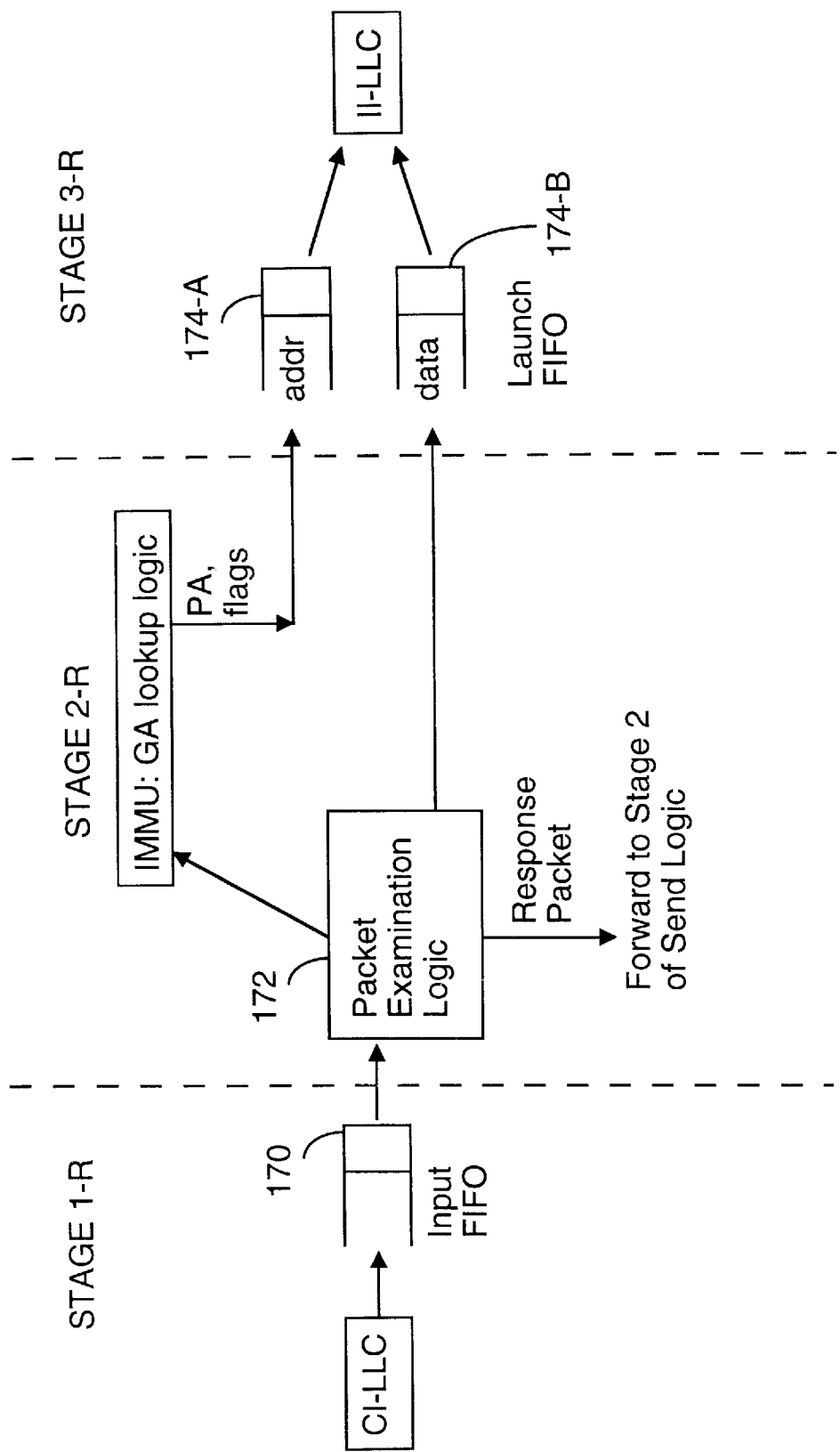
FIG. 5C  NIC Rcv Logic

SYSTEM AND METHOD FOR PRESERVING MESSAGE ORDER WHILE EMPLOYING BOTH PROGRAMMED I/O AND DMA OPERATIONS

The present invention relates generally to computer networks using memory mapped programmed I/O and DMA (direct memory access) operations for passing messages between the nodes of a computer network, and particularly to a network interface and message passing mechanism for preserving message order in a cluster of computer nodes, without using ordering and synchronizing barrier instructions, while employing both programmed input/output (PIO) and DMA (direct memory access) operations.

BACKGROUND OF THE INVENTION

Traditional message passing in a memory mapped computer network environment employs programmed I/O and DMA (direct memory access) operations. The present invention unifies these two methods to achieve the low CPU overhead of DMA for both programmed I/O and DMA, using a "write only" model of communication that is "ordering barrier" free. Richer and more reliable communication primitives, such as RPC, RMI and the like, can be built on top of the communication mechanisms of the present invention.

The present invention is directly primarily at message passing between the nodes of a cluster, where the term "cluster" means a set of computer system nodes that are interconnected by an interconnection fabric that exhibits the properties of a highly reliable, very low bit error rate, memory system interconnect. Usually, all the nodes in a cluster are located in the same room or building. However, the present invention may find wider use as the reliability of communications between more distant nodes improves.

Referring to FIG. 1, the context of the present invention is a distributed computer system 100 in which two or more computer system nodes 102 are interconnected by a communication network 104. Each computer system node 102 includes a network interface card (NIC) 106, and one or more distinct CPUs 106. The particular implementation of the computers at each node is irrelevant to the present invention, so long as the computer (or computers) at each node is capable or performing both programmed I/O and DMA operations and includes a network interface 106. The nodes 102 of the system can include single processor nodes, parallel processor nodes and symmetric processor (SMP) nodes.

For the purposes of this document, the term "programmed I/O" or "PIO" is defined to mean a data transfer from a first, local memory mapped address location in a first node to a second, remote memory mapped location, call called destination location, in a second node. PIO is typically accomplished by executing a load instruction to load data from the first memory mapped location into a local register, and then executing a store instruction to store the data from the local register to the second memory mapped location. If the data is already available in a local register due to the result of a prior computation, only the store instruction is needed to transfer it to the destination location. In the present invention, the term "PIO" refers to both the one and two CPU instruction versions, depending on the computational context in which the PIO operation is performed. Similarly, the terms "PIO instruction" and "PIO command" can mean one or two CPU instructions, depending on the context.

Thus programmed input/output (PIO) is a method of data transfer in which the CPU 108 of the sending device literally executes one or two instructions for directly controlling the transfer of each "data chunk" from a local memory location to a remote memory location. When PIO is used in a memory mapped network, a PIO store instruction executed in one computer can directly write data into the memory of another computer. This "remote write" capability, which is well known to those skilled in the art, will be explained in more detail below with respect to FIGS. 2, 3 and 4.

Typically, a "data chunk" is the amount of data that can be transferred over the network 104 as a single atomic action, from the viewpoint of the CPU. If the atomic unit of data transfer is 64 bytes, then transmitting a message 128 bytes in length would take two PIO commands and transmitting any message whose length is 64 bytes or less would take only one PIO command.

PIO is well known to be efficient for the transmission of short messages, in part because the message can be written directly to any memory location in destination node that has been exported to the sending node. The destination location for a PIO operation does not need to be page aligned, and thus it is often unnecessary for the receiving system to copy the received message before processing it. This avoidance of making a local destination copy helps make the use of PIO very efficient.

However, PIO is inefficient for the transmission of long messages. For instance, transmitting a "one page" message of 8K (8096) bytes in a system with a 64 byte atomic unit of data transfer would require 128 PIO commands (i.e., 128 pairs of CPU load and store instructions) to read data from a source location and to write the data to the memory mapped destination location. Thus, transferring even a single memory page using PIO ties up the sending system's CPU for hundreds of CPU cycles. Generally, most computer systems handle "long" data transfers (typically more than the amount of data that could be transferred with 20 or so PIO commands) through the use of DMA operations.

DMA operations are performed by a hardware assisted data transfer mechanism (herein called DMA logic) in which "control descriptors" or "control blocks" are first established in both the sending and receiving system nodes. The control descriptors define the starting address of the data source, the starting address of the data destination, the amount of data to be transferred, and various control flags for invoking interrupts, acknowledgment signal mechanisms and the like at the conclusion of the data transfer. Generally, both the source and destination locations of a DMA operation must be page aligned. After the control descriptors have been established, which can take anywhere from ten to a hundred or so CPU instructions depending on the implementation, the data transfer is handled entirely by the DMA logic, freeing the CPU to perform other operations while the DMA logic handles the data transfer.

DMA is efficient because it does not burden processor. However, DMA cannot be used to transmit short message headers to locations that are not page aligned. Thus, when a "multipart message" is transmitted to a destination location using DMA it is often necessary for the receiving system to copy the various components of the message to their respective "real" destination locations, some of which are page aligned and some of which are not page aligned. This receive side copying requirement can substantially reduce the efficiency of using DMA to transfer messages between computer nodes.

For the purposes of this document, the term "multipart message" is defined to mean a message having at least two distinct components, each of which must be transmitted to a different respective destination memory location. Typically, at least two of the respective destination memory locations are not contiguous with each other since one of the respective destination memory locations is usually a page aligned receive buffer and another is usually a slot in a queue or array data structure.

FIG. 2 shows a simplified representation of a conventional communications interface (or NIC) 106, such the ones used in the computer nodes 102 of FIG. 1, showing only the components of particular interest. The NIC 106 typically includes two address mapping mechanisms: an incoming memory management unit (IMMU) 121 and an outgoing memory management unit (OMMU) 122. The purpose of the two memory management units are to map local physical addresses (PA's) in each computer node to global addresses (GA's) and back. Transport logic 124 in the NIC 106 handles the mechanics of transmitting and receiving message packets, including looking up and converting addresses using the IMMU 121 and OMMU 122.

The dashed lines between the memory bus 110 and the IMMU 121 and OMMU 122 represent CPU derived control signals for storing and deleting address translation entries in the two memory management units (MMU's), typically under the control of a NIC driver program. The dashed line between the memory bus 110 and the transport logic 124 represents CPU derived control signals for configuring and controlling the transport logic 124.

Memory Mapping between Virtual, Local Physical and Global Address Spaces

Referring to FIGS. 3 and 4, the nodes in a distributed computer system utilize a shared global address space GA. Each node maps portions of its local address space into "windows" in the global address space. Furthermore, processes on each of the nodes map portions of their private virtual address space VA into the local physical address space PA, and can furthermore export a portion of the local physical address space PA into a window in the global address space GA. The process of "exporting" a portion of the local physical address space is also sometimes referred to as "exporting a portion of the local physical address to another node," because another computer node is given read and/or write access to the exported portion of the local physical address space via an assigned global address space range.

It should be noted that the local physical addresses (e.g., PA1 and PA2) shown in FIGS. 3 and 4 are physical bus addresses and are not limited to memory location addresses. In fact, many physical addresses are actually mapped to devices other than memory, such as the network interface. For example, when physical memory on a first computer is exported to a second computer (which includes mapping them to a set of global addresses), the physical addresses used in the second computer to write to the exported memory are not mapped to local memory; rather they are mapped to the second computer's network interface which in turn maps them into the global addresses exported by the first computer.

As shown in FIG. 4, when a message header containing a destination address is sent from a process in a first node 102-1 to a process in a second node 102-2, we have a series of address translations (also called address mapping translations) of the destination address. A virtual address VA1 from a process in a first node 102-1, is first translated by the TLB (translation lookaside buffer) 120-1 in a CPU 108-1 in the first node 102-1 into a local physical address PA1. The local physical address PA1 is then translated by the OMMU 122-1 in the first node's network interface 106-1 into a global address GAx. When the message containing the global address is received by the second node 102-2, the global address is converted by the IMMU 121-2 in the second node's network interface 106-2 into a local physical address PA2 associated with the second node. The local physical address PA2 corresponds to a virtual address PA2 associated with a receiving process. A TLB 120-2 in a CPU 108-2 in the second node maps the virtual address VA2 to the local physical address PA2 where the received message is stored.

It should be noted here that TLBs generally only translate virtual addresses into local physical addresses, and not the other way around, and thus some of the arrows in FIG. 4 represent mappings rather than actual address translations. When the receiving process in the second node 102-2 goes to read a received message at address VA2, the TLB 120-2 will translate that virtual address into the same local physical address PA2 determined by the network interface's IMMU 121-2 as the destination address for the received message.

Address space ranges for receiving messages are pre-negotiated between the sending and receiving nodes using higher level protocols that typically use reserved address space, mailbox, or packet based communications that are set up for this purpose. Typically, "mapin" and "mapout" functions are used to store the necessary TLB, IMMU and OMMU entries required to enable memory mapped message passing between send buffers on one side and receive buffers on the other. These mappings are defined by kernel controlled communication setup procedures that are separate from the message transmission procedures that are the subject of the present invention. The details of how windows in the global address space are assigned and how receiver side addresses are set up for receiving messages are beyond the scope of this document. Furthermore, the present invention requires just a few changes in these communication setup mechanisms, in particular: (A) the supplementing of the information stored by each OMMU entry to include an I/O class assignment, the purpose of which will be explained below, and one or more flag values for controlling how the associated locations are remotely accessed, and (B) the storage of certain virtual address to local physical address mappings in the IMMU. These supplemental OMMU and IMMU settings will be described in more detail in the "Description of the Preferred Embodiments" section of this document.

Receive buffers are allocated in conveniently sized chunks using a combination of mappings of the IMMU of the receiving system and the OMMU of the sending system. Each MMU entry can map a different size address range. For example, one MMU entry may map an address range or receive buffer having a size of 4096 bytes while another maps a receive buffer of size $2^{18}$ bytes. The address range mapped by each MMU entry must have a length equal to $2^N$ memory units, where N is a positive integer. It should be noted that each MMU entry is typically called a "page," where the size of the "page" mapped by each MMU entry varies from one page to the next.

When a processor in a first node requests that a processor in a second node allocate a receive buffer having a specified page size, if the second node's largest available chunks of memory are smaller than the specified page size the second node will allocate and export a number of memory chunks having smaller page sizes than the specified page size. As a result, the memory exporting node will set up IMMU entries having the smaller page size for each of the exported memory chunks and the first node will set up a corresponding OMMU entry for each IMMU entry set up in the memory exporting node. Larger receive buffers, or receive buffers of irregular size, may be constructed using multiple MMU entries.

Once the receive buffers are allocated and the corresponding MMU mappings are established, user level programs can read and write to the receive buffers without kernel intervention. Many different kinds of user-level message passing "API's" (application program interfaces) can be built on top of the basic receive buffer mechanism. This includes the send and receive Unix primitives, sockets, ORB (object resource broker) transport, remote procedure calls, and so on. The basic message passing mechanism is designed to be as "light weight" and efficient as possible, so as to take as few processor cycles as possible.

The PIO/DMA Problem

In many situations, it would be convenient to be able to send one part of a message using programmed I/O and another part by DMA. For instance, in a network file system, the transfer of a file or a portion of a file from one node to another requires the transmission of a "header" to one memory location and a data block to a second memory location. The data block is typically sent to a receive buffer that is aligned with a memory page boundary, while the header is sent to a slot in an array of file descriptors. The slots in the file descriptor array are generally not page aligned. However, the exact destinations of the two message portions are not important. What is more important is that (A) the two message portions cannot be transmitted using a single DMA operation because the two portions are being sent to different destination addresses, and (B) transmission of the header is usually handled most efficiently with programmed I/O, while transmission of the data block is usually handled most efficiently with DMA.

However, transmitting one portion of a message with PIO and another portion with DMA introduces an inherent, although somewhat hidden, problem due to the way PIO and DMA transfers are handled. In "sequentially ordered" networks, PIO transfers are always handled sequentially, meaning that each PIO instruction is always executed after the completion of a previously generated PIO instruction, and DMA transfers are always handled sequentially. However, there is absolutely no guarantee about the relative order of execution of PIO and DMA instructions. Thus, an instruction sequence such as PIO1, PIO2, PIO3, DMA, when submitted to the interconnect might be executed in some other order, such as PIO1, DMA, PIO2, PIO3. In other networks, sequential ordering is not guaranteed and PIO and DMA transactions are subject to reordering with respect to each other, except when special barrier instructions are executed. The execution of an appropriate barrier instruction is used to instruct the CPU to complete the execution of all instructions (or all instructions of a particular type, such as all store instructions) before executing any of the instructions after the barrier instruction.

In this document, the terms "PIO instruction" and "PIO command" are used interchangeably. Similarly, the terms "DMA instruction" and "DMA command" are used interchangeably. In addition, the terms "local address," "physical address" and "local physical address" are used interchangeably.

A mechanism that can be used to force sequential ordering of data transfer instructions in a non-sequential network is the use of data transfer instructions that include an end-to-end acknowledge requirement followed by data transfer or other commands that include a synchronization requirement. In particular, a first data transfer requiring an end-to-end acknowledgment from the receiving node, followed by a second data transfer or other command with a synchronization requirement that blocks execution of the second data transfer or command until the completion of the first data transfer (as well as any other prior data transfers), will block the execution of the second data transfer or command until the acknowledgment for the first data transfer has been received by the sending node. As a result, the second data transfer or command will be ordered sequentially after the first data transfer, even if the two are transmitted over an interconnect capable of re-ordering data transfer packets.

Getting back to the above described problem of transmitting a message having a relatively short header and a much longer data portion, the problems with sending such messages are as follows. If the entire message is transmitted using programmed I/O, that is an inefficient use of CPU resources because of the very large number of CPU cycles required to perform the transfer of the data portion of the message. If the message is transmitted using PIO for the header and DMA for the data portion, the problem is that the instructions must be formulated in a way that forces the PIO instruction to be completed before the DMA operation is completed. When the DMA operation completes, the DMA mechanism typically generates an interrupt or notification message. The interrupt typically triggers execution of a procedure in one of the receiving node's processors for processing received messages. A notification message is written to an address, typically in memory, that is polled by a procedure in the receiving system. When the polled location contains a notification message, the receiving system knows that it has received a message requiring processing. For the purposes of this document, interrupt and notification messages are equivalent since they both cause a previously sent message to be processed, even through they use different techniques to accomplish the same objective.

If the DMA operation is completed first, the header information needed by the receiving system to process the message may not be present when the receiving system is ready to process the received message, causing an error condition. Generally, to ensure completion of the header transfer before the DMA operation, the PIO instruction must be followed by a barrier instruction:

1) PIO transfer of header
2) Barrier instruction
3) DMA transfer of data portion of message
4) Interrupt or Notify Message The barrier instruction not only blocks the DMA transfer from being performed before the PIO transfer, it prevents the DMA transfer command from even being executed by the CPU until the PIO transfer completes. Execution of the DMA transfer command is delayed not only by the round trip signaling time, but also by all the software overhead required to verify the completion of all commands prior to the barrier instruction and then to resume execution of the instruction stream.

It should be noted that setting up the PIO instruction to include an end-to-end acknowledgment requirement (typically through the use of an "ack required" flag in the message header), does not solve the problem being addressed here because the PIO and DMA instructions are typically handled by different, parallel I/O mechanisms, and therefore the acknowledgment requirement on the PIO instruction will typically have no effect on the execution of the DMA instruction. The acknowledgment requirement on the PIO instruction, in combination with a synchronization requirement on a subsequent PIO instruction, forces the interconnect logic to complete the PIO instruction and wait for the acknowledgment to be returned before executing the subsequent PIO instruction in the same I/O class as the PIO instruction, only ensures sequential operation with respect to other PIO instructions assigned to the same I/O class (i.e., assigned to the same transmit queue).

Thus, in many prior art systems that employ this combination of PIO followed by DMA to send long messages, a barrier instruction is inserted between the PIO and DMA instructions to ensure that both portions of the message are received by the receiving system before the interrupt or notification at the end of the message is generated.

The present invention eliminates the need to use barrier instructions between the PIO and DMA portions of a message while still ensuring the sequential ordering of the successive PIO and DMA data transfers.

SUMMARY OF THE INVENTION

The present invention is a system and method for processing programmed I/O (PIO) commands and DMA (direct memory access) commands from one or more data processors at a node of a computer network. The computer network uses memory mapped PIO and DMA operations for passing messages between the nodes of the computer network. Each computer network node includes a network interface that includes at least one data transfer queue. The network interface receives both PIO and DMA commands.

"PIO store" commands each include a destination address and a chunk of data to be written to the destination address. "DMA store" commands each include a starting destination address, a starting source address, and a data transfer length value indicating how much data to transfer.

The network interface includes an outgoing memory management unit (OMMU) that maps the destination address specified by the PIO store and DMA store commands into global addresses. In a preferred embodiment, the OMMU also maps each such address to one of the data transfer queues. All PIO store commands and DMA store commands are temporarily stored in the data transfer queue to which the corresponding destination address is mapped by the OMMU.

The PIO and DMA commands stored in each data transfer queue are converted into data transfer packets in the same order that the PIO and DMA commands were added to the data transfer queue, and the resulting packets are transmitted across the interconnect between nodes in that same order.

When a single message is transmitted using both PIO store and DMA store commands, the OMMU entries for the destination addresses for both the PIO store and DMA store commands are set up so that they are all mapped to the same data transfer queue. As a result, the message components associated with the PIO store and DMA store commands are transmitted across the interconnect to the receiving system in the same order that the associated PIO store and DMA store commands are executed by the CPU.

If the interconnect can reorder packet transmissions, the network interfaces in the nodes of the network use well known mechanisms to reassemble the packets transmitted between each pair of nodes in the order they were launched into the interconnect.

BRIEF DESCRIPTION OF THE DRAWINGS

Additional objects and features of the invention will be more readily apparent from the following detailed description and appended claims when taken in conjunction with the drawings, in which:

FIGS. 5A, 5B and 5C depict portions of a network interface in accordance with a preferred embodiment of the present invention.

DESCRIPTION OF THE PREFERRED EMBODIMENTS

The description of FIGS. 1, 2, 3 and 4 provided earlier in this document is essential for an understanding of the remainder of this document, and therefore it is suggested that the reader review the description of FIGS. 1, 2, 3 and 4 provided above.

Figure 1:
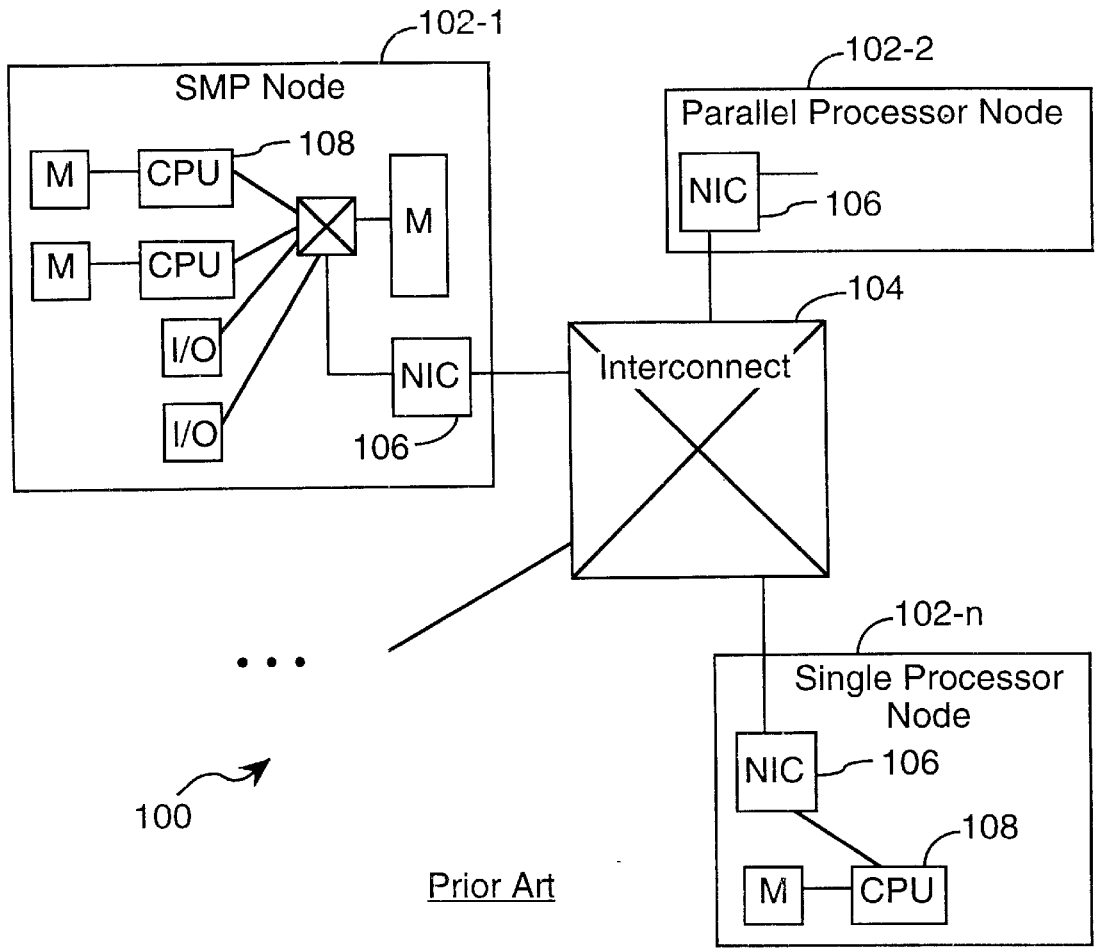
FIG. 1 is a block diagram of a distributed computer system having multiple system nodes, including single processor nodes and symmetric multiprocessor nodes and parallel processor nodes.
Figure 2:
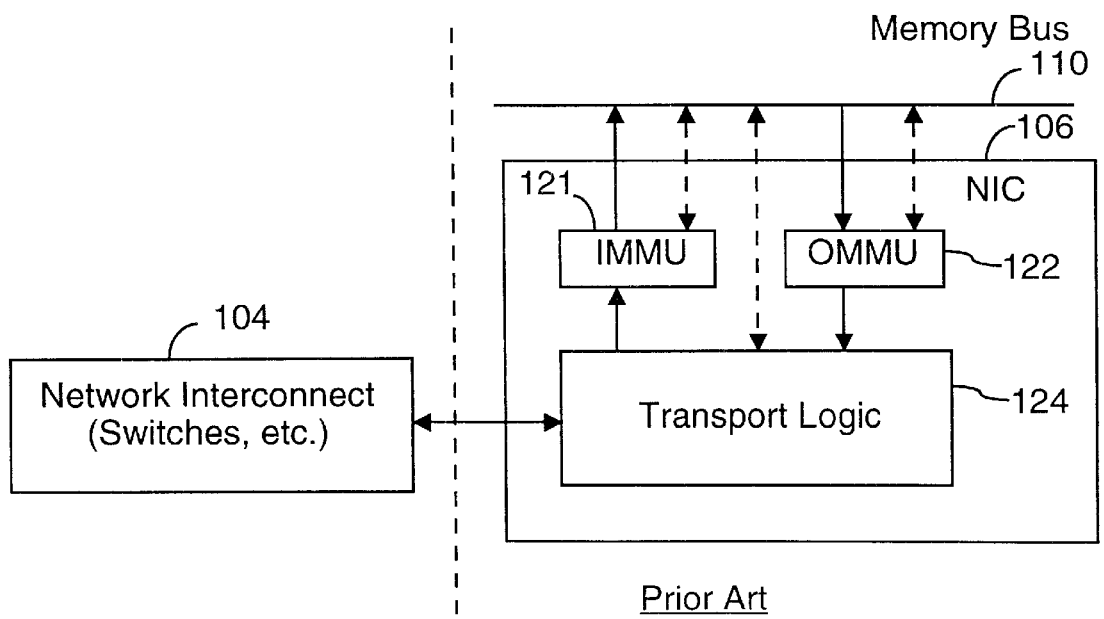
FIG. 2 is a block diagram depicting the components of the communications interface found in each computer of a computer network.
Figure 3:
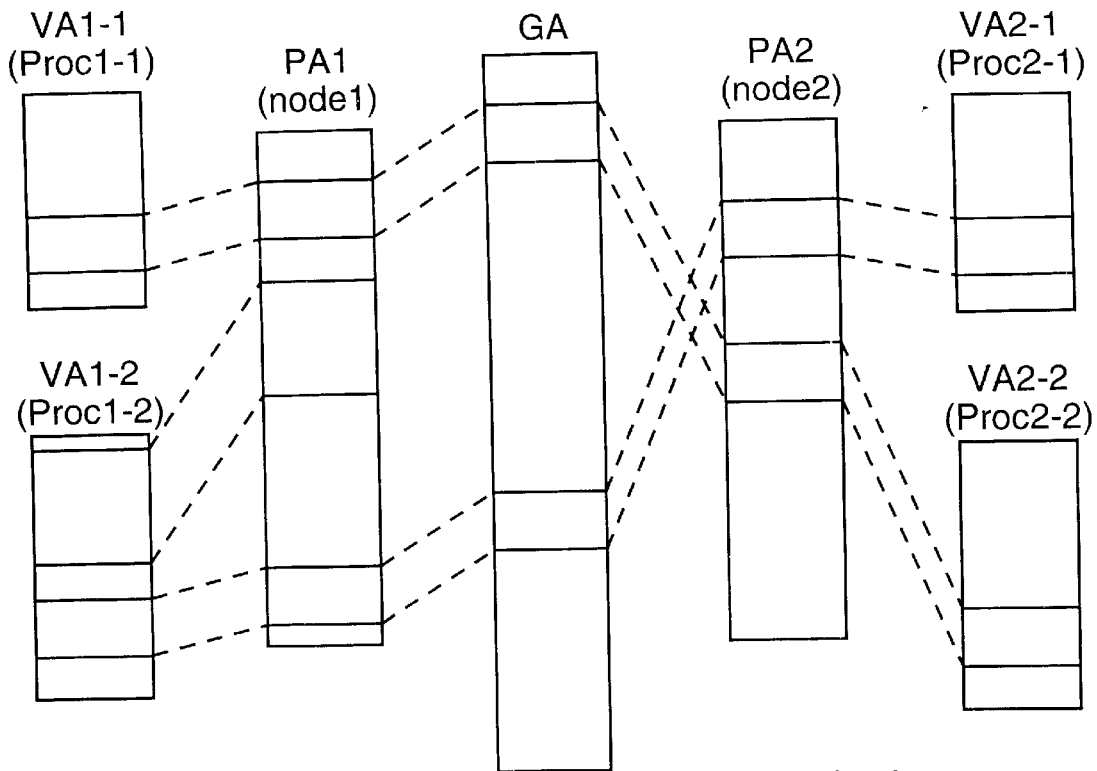
FIG. 3 depicts virtual, local and global address spaces and mappings between those address spaces.
Figure 4:
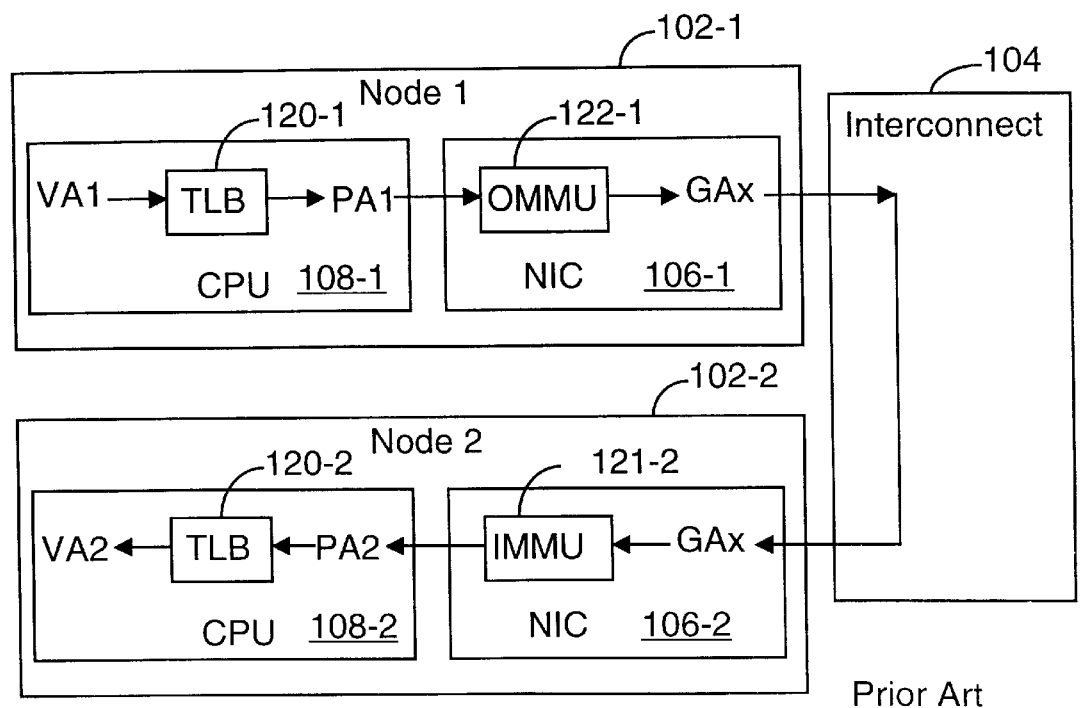
FIG. 4 is a block diagram of the computer modules used to perform address translations associated with transmitting data from a first node to a second node of a distributed computer system.
Figure 5A:
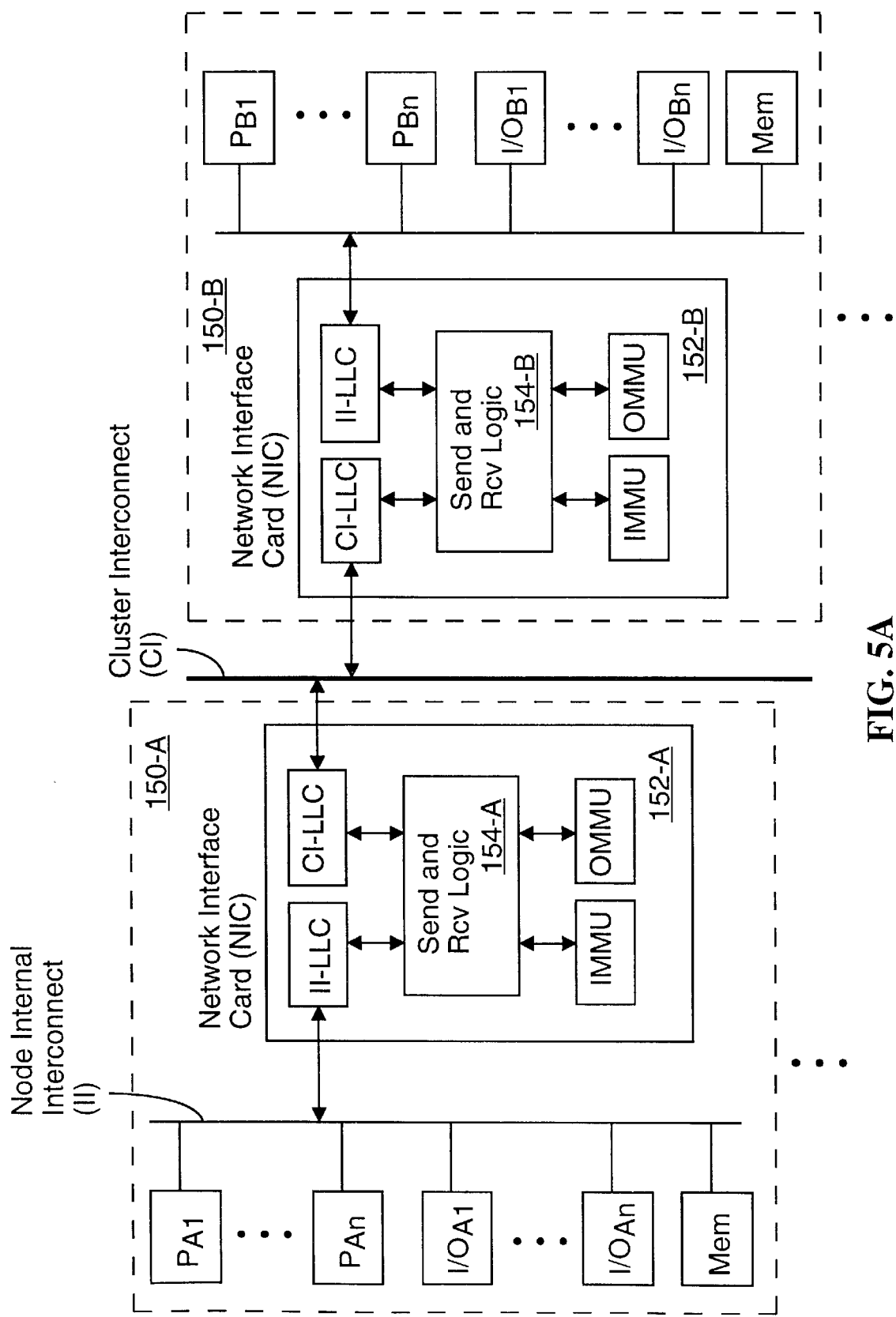

Referring to FIG. 5A, in a multiple-node cluster of computer systems using the present invention each node i 150 can has one or more processors $P_{ij}$ (also called CPUs) and one or more memory modules (Mem), and may also have one or more input/output (I/O) modules I/O$_{ik}$. These are interconnected by a node internal interconnect (II) to each other and a network interface (NIC) 152. The nodes 150 are interconnected, via the network interfaces and a cluster interconnect (CI). Both II and CI can be any suitable interconnection network.

Each network interface 152 includes:
- an IMMU and OMMU for performing memory mapping tasks;
- an II-LLC (internal interconnect link layer controller) for handling data transfers to and from local physical memory and/or between devices coupled to the node's internal interconnect and the network interface;
- a CI-LLC (cluster interconnect link layer controller) for handling data transfers between the network interface and the cluster interconnect; and
- send and receive logic 154, which will be described in more detail with respect to FIGS. 5B, 5C, 6, 7A and 7B.

The II-LLC and CI-LLC can be conventional interconnect link layer controllers.

For the purposes of describing the preferred embodiment of the present invention, it will be assumed that the CI does not change the relative order of packets transmitted over the CI between any two particular nodes 150. However, the present invention can also be implemented in systems in which the CI does have the ability to reorder packets. For instance, to ensure the proper ordering of packets transmitted over such a cluster interconnect, the packets can be given sequence numbers, with the receiving node's network interface having responsibility for reassembling the packets in the order specified by their sequence numbers before delivering them to their specified destination address.

It is also assumed the that CI has a very low error rate, similar to the error rates associated with the memory bus inside a conventional computer. Therefore, errors do not need to be detected in band. Rather, communication errors can be handled asynchronously using higher level end-to-end protocols. For instance, each transmitted message may have an embedded CRC error detection code that is checked by the receiving system. The receiving system asynchronously sends an error message to the sending system whenever a message is processed that fails a CRC check.

It is further assumed that the cluster interconnect does not lose transactions due to congestion or flow control at the destination node without notification of the sender. The CI-LLC is responsible for satisfying all applicable reliable delivery requirements and for reporting error conditions to the sender (e.g., via the PIO_store_sender_notify command discussed below).

In addition to the normal memory mappings performed by the TLB, OMMU and IMMU, as described in the Background of the Invention portion of this document, when these address mapping mechanisms are set up during a communication set up phase, one additional type of address mapping is set up in the IMMU. In particular, for each local memory address range to be used as either (A) the data source for a DMA data transfer to remote memory, or (B) the local receive buffers in which communication completion and error status codes are written after the completion of message transmissions, a corresponding virtual to physical (VA to PA) mapping is stored in the IMMU. In order to ensure that these VA to PA mappings do not interfere with normal (GA to PA) IMMU mappings, a predefined set of high order address bits, the value of which is herein called the VAtoPAprefix, are superimposed on the virtual addresses to be mapped by the IMMU. To look up a virtual address in the IMMU, the VAtoPAprefix is concatenated or combined with the virtual address and the resulting address value returned by the IMMU is its corresponding physical address (assuming an entry for that virtual address exists in the IMMU).

Thus, when the virtual address space for a process that will be sending messages to a remote receiving node is being set up (e.g., by a "mapin" procedure) to define the send buffers and sender notification locations for those message transmissions, the virtual address setup procedure not only defines the virtual to physical address space mappings for those locations in the virtual address mapping table used by the sending processor's TLB, it also stores corresponding VA to PA entries in the IMMU:

IMMU entry lookup address: VAtoPAprefix+VA of send buffer or sender notification location IMMU return value: physical address (PA), control flags, etc.

Note that the VAtoPAprefix value defines a reserved window in the global address space that is set aside for use by the proxy DMA engine. Each node allocates such a reserved window in the global address space for converting DMA source addresses into local physical addresses.

Sending Side Of Network Interface

Referring to FIG. 5B, the send side logic of the network interface 152 has three stages, labeled Stage 1-S, Stage 2-S and Stage 3-S. Stage 1-S receives data transfer commands from the II-LLC and stores them in an Input FIFO 160. The commands received at the Input FIFO 160 are preferably memory mapped commands. The network interface processes each received command by performing the associated memory mapped command.

This means that when a processor generates a PIO command, the PIO is put on the internal interconnect as a store or load command, but the high order bits on the asserted address contain a "memory mapped" command. The asserted address is the destination address for PIO store commands and is the source address for PIO load commands. The high order bits used to specify the memory mapped command are bits that are normally unused because they are not needed to address any physical resources. Examples of memory mapped commands used in the preferred embodiment are:

| Command | Description |
| --- | --- |
| PIO_store | normal programmed I/O store of data stored in a CPU register to an address that is mapped to a remote memory location. |
| PIO_store_proxy_DMA | proxy DMA operation (described in more detail below). |
| PIO_store_commit | a programmed I/O store that requires an end-to-end acknowledgment from the receiving system's network interface after the data has been written to remote memory. |
| PIO_store_sender_notify | loads an error status value from the cluster interconnect link layer into a local memory location. Execution of this command is delayed until all prior data transfers assigned to the same I/O class FIFO are completed. |

The PIO_store_commit command can be implemented as either a separate memory mapped command, or as a standard PIO_store command and the use of an OMMU that includes an "end-to-end acknowledgment flag" in each entry. In the latter implementation, certain address ranges mapped by the OMMU can be marked as requiring an end-to-end acknowledgment of the last packet, or all packets, sent to any address in that range by any of the PIO_store functions simply by setting the "end-to-end acknowledgment flag" in the OMMU entries for those address ranges. In a preferred embodiment, both techniques are used for determining when an end-to-end acknowledgment flag is required.

Stage 2-S has a state machine 162 that executes the memory mapped commands received by the network interface, and thus processes each PIO and DMA command in the Input FIFO 160. To "execute" any particular received PIO or DMA command, Stage 2-S performs whatever OMMU and IMMU lookups are needed, identifies the read or write Stage 2 FIFO for the transaction (from the I/O class value output by the OMMU lookup), packetizes the transaction and puts the resulting packet or packets for the transaction in the identified FIFO. Load commands are packetized and put in read queues (i.e., FIFO's), and store commands are packetized and put in write queues. While each PIO command generates a single packet, a single DMA load or store command can produce many packets.

For the purposes of this document, the terms "I/O class" and "FIFO class" shall be used interchangeably to refer to a classification or label used to identify each of the pairs of Stage 2-S FIFO's used for holding packets to be transmitted across the cluster interconnect.

As shown in FIG. 5B, the network interface may provide more than one pair of Stage 2 read/write FIFO's. Each pair of FIFO's is called a "I/O class" and the I/O class to which any PIO or DMA command is assigned is determined by looking up the remote destination or source address in the OMMU, which returns not only a global address, but a set of control flags and an I/O class value as well. The I/O class value stored in the OMMU for the remote address specifies the I/O class of the FIFO where the packetized command is stored in Stage 2-S.

The I/O class is determined or assigned by the kernel during a communication setup phase. The control flags stored in each OMMU entry include an end-to-end acknowledgment flag and a synch flag, the operation of which are described elsewhere in this document. Each OMMU entry, as defined during the communication setup phase, stores the following fields: a global address, a page size indication, the node ID of the node which owns the resources corresponding to this OMMU entry, an I/O class, control flags, and other fields not relevant to the present discussion (such as fields defining the sending node's access rights to the remote memory mapped locations).

The packets in each of the Stage 2-S read/write FIFO's are handled in sequential order. That is, within each Stage 2-S FIFO, the packets are launched into the cluster interconnect in the same order that they are stored in the FIFO.

Stage 3-S has a scheduler 164 that selects a Stage 2-S FIFO that is not stalled and that contains at least one packet, and puts the topmost packet from the selected Stage 2-S FIFO into the transmit FIFO 166, from which it is launched into the cluster interconnect. The scheduler 164 may use any suitable arbitration scheme to collect packets from the FIFO's when more than one FIFO is ready to send. The scheduler continually selects packets from non-stalled Stage 2-S FIFO's and puts them in the transmit FIFO 166, so long as the transmit FIFO is not full and there are packets remaining in any of the non-stalled Stage 2-S FIFO's.

When a packet requiring an end-to-end acknowledgment is moved into Stage 3-S, it is not removed from the Stage 2-S FIFO, but the head end pointer for the FIFO is still advanced to the next item in the FIFO. Each packet requiring an end-to-end acknowledgment is removed from its Stage 2-S FIFO only when the corresponding acknowledgment reply is received by the sending node's network interface. As a result, all the packets from a Stage 2-S FIFO that have end-to-end acknowledgment requirements and that have been copied into Stage 3-S but which have not yet received an acknowledgment reply remain in the Stage 2-S FIFO.

Packets with end-to-end acknowledgment requirements do not blocking the movement of subsequent packets into Stage 3-S. A Stage 2-S FIFO is stalled only when at least N packets requiring end-to-end acknowledgments have been copied from the Stage 2-S FIFO into Stage 3-S but have not yet received an acknowledgment reply, where N may vary from system to system and FIFO to FIFO. For instance, N may be determined by the OMMU for each FIFO class, subject to a maximum N value determined by the applicable hardware (such as the FIFO depth).

Providing multiple I/O classes of Stage 2-S FIFO's is important so that a stall in one of the I/O classes, due to a slow or congested receiving node or any other cause of contention in the cluster interconnect, does not block the transmission of important messages in other I/O classes, such as messages in a kernel class, which might be used to send kernel messages between nodes. Providing multiple parallel classes of Stage 2-S FIFO's (also called data transfer queues) is important for making efficient use of the cluster interconnect and for maintaining overall system performance.

A Stage 2-S FIFO can be indirectly stalled by sending a PIO command to it with a synchronization requirement. The synchronization requirement requires that all earlier data transfers be completed before the execution of the command with the synchronization requirement. This stops any new packets from being stored in the Stage 2-S FIFO until all previous packets in the Stage 2-S FIFO have been transferred to Stage 3-S and cleared from the Stage 2-S FIFO. If any of the packets in the Stage 2-S FIFO have end-to-end acknowledgment requirements, then the command with the synchronization requirement is not executed, and no new packets are stored in the Stage 2-S FIFO, until all those pending packets receive their respective acknowledgment replies. As a result, the Stage 2-S FIFO may be quickly emptied of packets waiting to be transferred to Stage 3-S, and will appear to be empty to the Stage 3-S scheduler.

To further explain the operation of Stage 2-S, two examples will be given. In these examples the following terminology is used:

sbuf (e.g., sbuf 1) refers to a send buffer in local memory;

rbuf (e.g., rbuf 2) points to a receive buffer in remote memory that is mapped to the local network interface. More specifically, rbuf is mapped in the OMMU in the local network interface to point to the receive buffer in the destination node. Each OMMU entry must be page aligned. The rbuf entry in the OMMU also contains an I/O class value, which indicates the Stage 2-S FIFO to use for sending data to the receive buffer.

Ibuf points a memory location in local memory for receiving a message delivery completion notification to the sending process.

EXAMPLE

Sending a Basic Message

In the preferred embodiment, to send a "basic message" the CPU sending the message executes a function called send_basic_msg( ). The send_basic_msg( ) function contains a sequence of CPU instructions, including three store commands with destination addresses mapped to the network interface. The destination addresses of the commands contain memory mapped commands for execution by the network interface.

```
/* Command Sequence for Sending a Basic Message */

/*-->            PIO_store(sbuf1, rbuf1); */
command 1A:     Load sbuf1 to register RO;
command 1B:     Store RO to rbuf1 + PIO_store;
/* -->           PIO_store_proxy_DMA(sbuf2, rbuf2, len2); */
command 2A:     Load <address of sbuf2> + len2 to register RO
command 2B:     Store RO to rbuf2+PIO_store_proxy_DMA;
/* -->           PIO_store(sbuf3, rbuf3); */
command 3A:     Load sbuf3 to register RO;
command 3B:     Store RO to rbuf3+PIO_store;
```

While a PIO command, such as the PIO_store_proxy_DMA and PIO_store_sender_notify commands, is being sent by a processor to the network interface, the destination address (rbuf) is transmitted on the address bus of the internal interconnect (II-LLC) and the source address (sbuf) and data length values are transmitted on the data bus (of the II-LLC).

The first pair of CPU commands generate a memory mapped PIO store command, PIO_store(sbu 1 ,rbuf 1), which writes the contents in local memory at sbuf 1 to a remote memory location at rbuf 1. The high order bits of the destination address rbuf 1 are replaced with the binary value of the PIO_store memory mapped command. The resulting memory bus transaction is treated as a PIO_store command by the network interface.

The purpose of this first PIO store command is to send a message header or file system header to an assigned location in the remote receiving node. In this example, the length of the message header is assumed to be no larger than the amount of data that can be stored in one CPU register. The CPU first loads the data from sbuf 1 into a register (R0 in the example above) and then does a store operation having the register as the source of the data to be written and "rbuf 1+PIO_store" as its address, where "PIO_store" consists of a set of high order address bits whose purpose is to make the normal store transaction into the PIO_store memory mapped command to be executed by the network interface. The Stage 2-S state machine executes the PIO_store memory mapped command by:

Looking up the destination address rbuf 1 in the OMMU to get (A) the global address GA for rbuf 1, (B) the I/O class of the write FIFO for the transaction, and (C) the control flags associated with the destination address.

Packetizing the transaction and storing it in the write FIFO for the I/O class specified by the OMMU table entry for the rbuf 1 destination address.

If the flags for the rbuf 1 location do not specify any special requirements, the packetized transaction is simply "queued and forgotten", enabling the Stage 2-S state machine 162 to process other transactions without having to revisit this transaction.

The second pair of CPU commands generate a memory mapped proxy DMA store command, PIO_store_proxy_DMA(sbuf 2, rbuf 2, len 2), which writes the contents in local memory at sbuf 2, having a length of len 2, to a remote receive buffer location at rbuf 2. The purpose of this command is to transmit the main data portion of the message to the remote receiving node. Proxy DMA store commands are converted by the state machine 162 into a sequence of packets in the write FIFO for the I/O class associated with the destination address, just as if a long series of PIO commands had been executed, except that the CPU executes a single "store" command and the network interface's send logic converts it into the equivalent of multiple PIO commands, without imposing any computational burden on the sending CPU. To be more specific, the Stage 2-S state machine 162 executes the memory mapped PIO_store_proxy_DMA command by:

Looking up the destination address rbuf 2 in the OMMU to get (A) the global address GA for rbu 2, (B) the I/O class of the write FIFO for the transaction, and (C) the control flags associated with the destination address. Generally, for a single message, the destination address for the proxy DMA operation must be assigned to the same outgoing FIFO class as the preceding PIO store command. This is necessary to ensure that the data for the proxy DMA command is transmitted over the cluster interconnect after the data for the preceding PIO store command.

Looking up the address "VAtoPAprefix+sbuf 2" in the IMMU to convert the sbuf 2 virtual address into a physical address. As described above, a section of the IMMU is used to map source buffer virtual addresses into local physical addresses. The VAtoPAprefix is stored in a special register 167 in the Stage 2-S circuitry and is concatenated or combined with the sbuf 2 address by IMMU lookup logic 168 to generate the address value to be looked up in the IMMU.

Packetizing the transaction and storing it in the write FIFO for the I/O class specified by the OMMU table entry for the rbuf 1 destination address. These packets go in the same outgoing write FIFO as was used for the preceding PIO store command and thus will be transmitted, in order, after the PIO store packet.

The third pair of CPU commands generates another memory mapped PIO store command, PIO_store(sbuf 3, rbuf 3), which writes the contents in local memory at sbuf 3 to a remote memory location at rbuf 3. The purpose of this command is to send a notification message to the remote receiving node that informs the receiving node that a message has been sent to it. The Stage 2-S state machine 162 executes this PIO_store command in the same way as the first PIO_store command. The address rbuf 3 must be mapped by the OMMU to the same FIFO class as the two earlier commands, thereby ensuring that the packet for this command is transmitted to the receiving system after all the data for the message has been transmitted to the receiving system.

The send_basic_msg( ) function returns after the three memory mapped PIO commands have been delivered to the network interface, which may be well before the message has been sent to the remote receiving node. Hence the sending node cannot reclaim the send buffers until a higher level protocol handshake from the receiving system confirms successful delivery of the message.

In another implementation of the send_basic_msg( ) function, the order to the first two PIO memory mapped commands could be reversed, sending the PIO_store_proxy_DMA command to the network interface before the first PIO_store command. This is possible because the notification message is not automatically generated by DMA logic; rather the notification message is explicitly generated by a PIO_store command that is ordered after the two data transfer commands.

Other implementations of the send_basic_msg( ) function will be needed when the message header and/or notification are too long to each be handled by a single PIO operation. In that case the first and/or third commands would be replaced by function calls for generating a sequence of load and store command pairs, one for each PIO operation needed until the full header and/or notification message has been processed.

EXAMPLE

Message Sending With Commit Notification

An example of a message send function that posts a notification to the sender only after an entire message has been successfully written to the remote receiving node's memory is the following send_msg_commit( ) function. This function generates four memory mapped PIO store commands, all having destination addresses mapped to the network interface. The destination addresses of the commands contain memory mapped commands for execution by the network interface.

```
/* Command Sequence for Sending a Message With
          Commit Notification */

/*-->         PIO_store(sbuf1, rbuf1); */
command 1A:   Load sbuf1 to register R0;
```

-continued

```
/* Command Sequence for Sending a Message With
   Commit Notification */ command 1B:   Store RO to rbuf1+PIO_store;
/* -->        PIO_store_proxy_DMA(sbuf2, rbuf2, len2); */
command 2A:   Load <address of sbuf2, len2> to register RO
command 2B:   Store RO to rbuf2+PIO_store_proxy_DMA;
/* -->        PIO_store_commit(sbuf3, rbuf3); */
command 3A:   Load sbuf3 to register RO;
command 3B:   Store RO to rbuf3+PIO_store_commit;
/* -->        PIO_store_sender_notify(Ibuf, rbuf3); */
command 4A:   Load <address of Ibuf> to register RO;
command 4B:   Store RO to rbuf3+PIO_store_sender_notify;
/-->          wait until something is written into Ibuf
              memory location */
command 5:    WaitToReceive(Ibuf)
```

When the send_msg_commit( ) function returns, the message is guaranteed to have been delivered to the destination node. The WaitToReceive function, command five of the send_msg_commit( ) function, can be implemented using either a spin lock (which uses loads only from local memory), block or wait primitive. Regardless of its implementation, the WaitToReceive function does not return control to the sending process until the PIO_store_sender_notify writes a value into the Ibuf memory location.

The first two pairs of CPU commands are identical with those used for the basic message send function, and thus need no further explanation. The third pair of CPU commands generates a memory mapped command, PIO_store_commit(sbuf 3, rbuf 3), that requires an end-to-end acknowledgment from the receiving system's network interface after the specified data has been written to the remote memory. As a result, the packet for this third memory mapped PIO command remains in its assigned Stage 2-S write FIFO until an acknowledgment packet is received from the receiving node's network interface, which in turn does not happen until the receiving node's network interface has written the packet from this command into memory in the receiving node.

The fourth pair of CPU commands generate a memory mapped PIO command, PIO_store_sender_notify(Ibuf, rbuf 3), that does not send a packet to the remote receiving node. Rather, the rbuf 3 destination address for the command is used for the purpose of looking up the rbuf 3 address in the OMMU so as to determine the FIFO class to which the command belongs. The Ibuf address (which is a local virtual address that has not been converted to a physical address by the CPU's TLB because it is treated as a data value by the function) is looked up in the IMMU, after its high order bits are replaced with "VAtoPAprefix", so as to convert the Ibuf virtual address into a corresponding physical address. The VAtoPAprefix is logically concatenated or combined with the Ibuf address so as to map the Ibuf VA address into a reserved window of the global address space GA, and then a lookup in the IMMU is performed to recover the local physical address (PA) of Ibuf.

After the OMMU and IMMU lookups have been completed, the PIO_store_sender_notify command is stored in its assigned Stage 2-S write FIFO as a special sender notification packet. The sender notification packet is never transferred to Stage 3-S; rather the sender notification command it represents is executed by the Stage 2-S state machine 162 when all packets ahead of it in the same I/O class FIFO have been completed are released from the FIFO. Furthermore, since the prior PIO command assigned to the same I/O class FIFO has an end-to-end acknowledgment requirement, the PIO_store_sender_notify command is not executed until the acknowledgment response packet for the prior PIO command is received.

In the preferred embodiment, the PIO_store_sender_notify command does not block any subsequent commands behind it from executing. For example, if T1, T2, T3 are three preceding data transfer transactions that are awaiting end-to-end acknowledgments, then the PIO_store_sender_notify transaction is interlocked with their completion. If a subsequent T4 transaction is generated for any message and is queued behind the PIO_store_sender_notify transaction, then T4 will be issued after T3 and will not be blocked by the PIO_store_sender_notify transaction. If a second PIO_store_sender_notify transaction is issued that is queued behind T4, then this second PIO_store_sender_notify will be interlocked with all pending transactions ahead of it in the queue, including T1, t2, T3, the first PIO_store_sender_notify, and T4. This interlocking behavior provides guaranteed message serialization at the sender interface at completion of the PIO_store-sender-notify command.

When the PIO_store_sender_notify command is executed, the state machine 162 writes into local memory, at the physical address for Ibuf, a message completion notification message that includes the error status value that has been accumulated by the cluster interconnect for packets previously stored in the same FIFO class as the FIFO class to which this fourth PIO command has been assigned. In other words, if any errors occurred during transmission of the message that were detected by the cluster interconnect or the CI-LLC, a corresponding error code is stored by the network interface in local memory at the Ibuf location.

Thus, when the fourth memory mapped PIO command generated by this function completes its execution by the network interface, the message has been completely transmitted to the remote receiving node, and the sending procedure or process receives a notification message that indicates (A) that the message transmission has completed, and (B) whether or not an error occurred during the message transmission.

Receiving Side Of Network Interface

Referring to FIG. 5C, the receiving side logic of the network interface 152 has three stages, labeled Stage 1-R, Stage 2-R and Stage 3-R. Stage 1-R receives packets from the CI-LLC and stores them in an Input FIFO 170.

Stage 2-R uses packet examination logic 172 to inspect the packet at the head of the input FIFO 170. If it is a response packet, the packet is forwarded to the Stage 2-S state machine for matching with the corresponding packet that is waiting in one of the Stage 2-S FIFO's. If the response packet is an acknowledgment response packet, the receipt of the response packet enables the Stage 2-S state machine to complete the processing of the corresponding packet, by deleting it from its FIFO and in some cases by also performing a local notification action. If the response packet is returning data requested by a read packet (i.e., a packet in a read FIFO), the two are matched up and the returned data is written to local memory at a location specified by the read packet.

If the received packet is not a response packet, its destination address is a global address that is converted by the IMMU into a local physical address and a set of control flags. The resulting address is stored in an address FIFO 174-A in Stage 3-R and the data from the packet is stored in a corresponding data FIFO 174-B. These two FIFO's 174-A and 174-B are collectively called the Launch FIFO.

Stage 3-R launches received packets from the Launch FIFO into the local internal interconnect (II-LLC), typically for storage in local memory.

In an alternate embodiment, the launch FIFO may be replaced with multiple pairs of FIFO's each having a respective assigned class, where the class for each received packet is determined by the IMMU lookup of the packet's global address to enable a higher priority message to not be blocked by a lower priority bulk data transfer.

There are additional advantages of the scheme outlined here, besides the solution to the PIO/DMA problem described earlier. First, the network interface transmit side is independent from the sending processor in a multiprocessor system. It does not matter from which processor a send sequence is initiated. A context switch of the sending process from one processor to another, even in the middle of a send sequence, is automatically handled by the network interface as there is no transaction dependence on the identity of the sending processor. This saves on expensive lock down of threads to specific processors during the send sequence in other prior art schemes. Second, having multiple FIFO's in Stage 2-S of the network interface enables a higher priority message to not be blocked by a lower priority message provided the two priorities are assigned to separate FIFO classes. Third, enabling each Stage 2-S FIFO to store multiple outstanding transactions that are awaiting end-to-end acknowledgments prevents a slower receiving node or congestion in the cluster interconnect from blocking messages to other receiving nodes.

PIO/DMA Module for Each Write Queue

Figure 6:
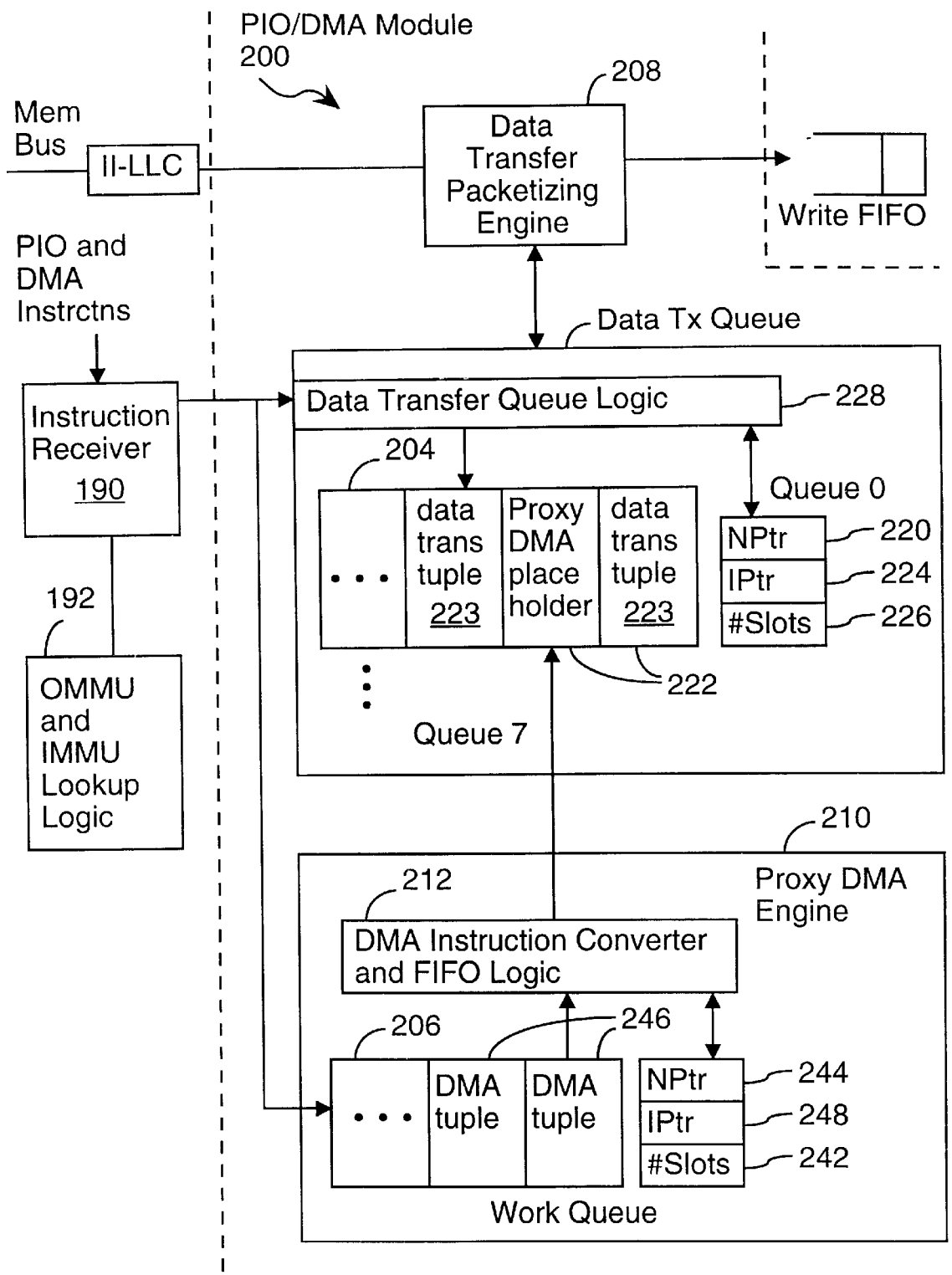
FIG. 6 depicts a preferred embodiment of a PIO/DMA module in a network interface for handling programmed I/O and DMA data transfers in an consistent and integrated manner.

Referring to FIG. 6, there is shown a preferred embodiment of a PIO/DMA module 200 in a network interface for handling programmed I/O and DMA data transfers in a consistent and integrated manner. One such module is provided for each write FIFO in Stage 2-S of the send side of the network interface (see FIG. 5B).

In accordance with the present invention, both programmed I/O commands and DMA data transfers are handled as identical "programmed data transfer" operations. These programmed data transfer operations have some of the characteristics of PIO commands and some of the characteristics of DMA data transfers. Once a PIO store command or DMA store command is conveyed by a CPU to the PIO/DMA module 200, the sending CPU is immediately relieved of responsibility for the transaction, freeing the CPU to perform other tasks. Also, the PIO/DMA module 200 serializes the execution of PIO and DMA operations assigned to the same I/O class so that the relative order of completion of PIO and DMA commands is maintained without the use of barrier instructions.

The Stage 2-S state machine includes an instruction receiver 190 and OMMU and IMMU lookup logic 192 that are shared by all the PIO/DMA modules 200. The instruction receiver 202 receives PIO and DMA instructions from the input FIFO in Stage 1-S, and conveys each received PIO or DMA instruction to one of the PIO/DMA modules in accordance with the I/O class associated with the PIO or DMA instruction's destination address.

More specifically, the OMMU and IMMU lookup logic 192 looks up the destination address of every received PIO store and DMA store command to (A) convert the destination address from a physical address to a global address, (B) obtain an I/O class assignment for the command, and (C) obtain any control flags associated with the destination address. Each OMMU entry contains all three of these pieces of information. Thus, the OMMU lookup determines which I/O class the received PIO or DMA command is assigned to. If the received command is a read command it is deposited in the read FIFO for the assigned I/O class. Otherwise it is transferred to the PIO/DMA module for the assigned I/O class.

For DMA store instructions and PIO_store_sender_ notify instructions the OMMU and IMMU lookup logic 192 also looks up the associated source address, which is carried in the data portion of the command sent to the network interface, in the IMMU to convert the source address from a virtual address into a local physical address.

The components of the PIO/DMA module 200 are:

A data transfer queue 204 for storing queued programmed data transfer commands. The programmed data transfer commands in the queue 204 are issued or executed in the same order as they are stored in the queue, but there is no serialization imposed on programmed data transfer commands in any one queue 204 with respect to the programmed data transfer commands in the queue 204 for any other FIFO classes. However, no ordering is imposed by the PIO/DMA module on the completion of the commands. The completion order will depend on many factors including (A) whether the cluster interconnect can reorder data transfer packets, (B) the relative distances to the destination nodes, and (C) relative delays in processing transactions on the receiving nodes. The queue 204 is preferably implemented either as a FIFO (first in first out) buffer, or as a circular buffer in which entries are always processed in the same order that they are inserted into the buffer. The remainder of this document assumes the use of queues implemented as circular buffers, but the scope of the invention includes other queue structure implementations.

A DMA work queue 206 for storing DMA commands until they are converted into programmed data transfer commands.

A packetizing engine 208, which packetizes the data transfers associated with each programmed data transfer denoted in the data transfer queue 204.

A proxy DMA engine 210, the primary components of which are the aforementioned work queue 206, and a DMA instruction converter 212, which converts each DMA command in the work queue 206 into one or more programmed data transfer commands.

Data transfer queue logic 228 for managing the insertion of items into and processing of items on the data transfer queue 204.

Except where the use of multiple I/O classes is specifically mentioned, for the purposes of explaining the operation of the PIO/DMA module, it will be assumed that the PIO and DMA instructions being discussed are all directed to the same I/O class.

Whenever a CPU at the local node generates a store instruction whose destination is in a portion of the local address space that is mapped to a remote physical memory location, the instruction is routed to the node's network interface card 106. A portion of the destination address, in the normally unused high order bits, is used to specify the particular memory mapped PIO instruction to be performed.

The data transfer queue 204 has an associated set of control parameters:

a "next queue slot" pointer (NPtr) 220, which points to the next queue slot 222 (if any) that contains a data transfer tuple 223 to be processed by the packetizing engine 208;

an "insertion point" pointer (IPtr) 224, which points to the next empty queue slot 222 (if any) into which a new a data transfer tuple 223 can be inserted; and a "number of free slots" value (#Slots) 226, which indicates the number of slots of the queue not currently occupied by active data transfer tuples (where an active data transfer tuple is one that is currently being processed by the data transfer engine 202, or one that has yet to be processed). The #Slots 226 parameter is used as a back pressure flow control signal for indicating to the Instruction Receiver when the PIO/DMA module is too backed up to handle a newly received PIO or DMA instruction.

A state machine called the data transfer queue logic 228 handles the updating of the control parameters for the data transfer queue 204 and determines the slot into which each new data transfer tuple should be inserted. The data transfer queue logic 228 also handles the reservation of a place holder slot 222 in the data transfer queue 204 whenever a DMA instruction is received.

The instruction receiver 190 initially processes each received PIO instruction. If the data transfer queue 204 in the PIO/DMA module for the instruction's I/O class is full (as indicated by the corresponding #Slots value 226 being equal to zero), the sending CPU is stalled until a data transfer queue slot 222 becomes available. When a queue slot 222 is available, the instruction is stored as a data transfer tuple 223 in a slot 222 in the data transfer queue 204 associated with the instruction's I/O instruction class. The data transfer queue 204 for each I/O class is sized to minimize stalling of the CPUs in the sending node under normal operating conditions. The data transfer queue 204 can also be made very large to make this stall situation occurrence very rare.

Figure 7A:
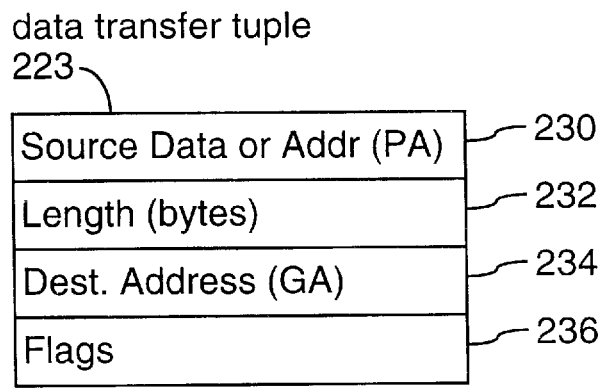
FIGS. 7A and 7B depict the data stored in each slot of the data transfer queue and DMA work queue in FIG. 6.

Referring to FIG. 7A, the data transfer tuple 223 for each received PIO instruction includes the following fields:

a source data value or local notification address (PA) 230, depending on the type of PIO instruction. This field is the data value to be written to the instruction's destination address unless the instruction is a PIO_store_sender_notify instruction, in which case the source data field is occupied by the local address to which an error status value is to be written;

a length value 232, indicating the number of bytes or data words to be transferred;

a destination address 234, represented as a global address (GA) value; and a set of flags 236 that indicate operations to be performed in conjunction with the data transfer. The flags 236 include both flags received from the OMMU when looking up the destination address as well as flags associated with the particular PIO instruction being processed.

Whenever a CPU 108 at the local node 102 generates a DMA instruction whose destination is in a part of the local address space that is mapped to a remote physical memory location (i.e., the destination address does not correspond to a local physical memory location), the instruction is routed to the node's network interface card 106. The DMA instruction, as written into the network interface, contains the following information:

an instruction code, indicating this is a DMA instruction;
a source address, represented as a virtual address;
a length value, indicating the number of bytes or data words to be transferred; the length value for a DMA instruction will generally represent anywhere from a couple of hundred bytes to many pages of data; and a destination address, represented as a local physical address value.

While a PIO command, such as the PIO_store_proxy_DMA and PIO_store_sender_notify commands, is being sent by a processor to the network interface, the destination address (rbuf) is transmitted on the address bus of the internal interconnect (II-LLC) and the source address (sbuf) and data length values are transmitted on the data bus (of the II-LLC).

As explained earlier, the source and destination addresses are looked up in the IMMU and OMMU, respectively, to generate a source local physical address, a destination global address, and a set of control flags. It is noted here that in the preferred embodiment, the destination address for all DMA operations begins on a page boundary.

Referring to FIG. 6, for each received DMA instruction, a "proxy DMA place holder" is stored in the next available slot in the data transfer queue 204, and a DMA tuple is stored in the next available slot of the DMA work queue 206.

The Proxy DMA engine's DMA work queue 206 has an associated set of control parameters:

a "next work queue slot" pointer (NPtr) 244, which points to the next queue slot 246 (if any) that contains a DMA tuple to be processed by the DMA instruction converter 212;

an "insertion point" pointer (IPtr) 248, which points to the next empty queue slot 246 (if any) into which a new a DMA tuple can be inserted; and a "number of free slots" value (#Slots) 242, which indicates the number of slots of the work queue 206 not currently occupied by active DMA tuples (where an active DMA tuple is one that is currently being processed by the DMA instruction converter 212, or one that has yet to be processed). The #Slots 242 parameter is used as a back pressure flow control signal for indicating to the Instruction Receiver 208 when the PIO/DMA module is too backed up to handle a newly received DMA instruction.

The DMA instruction converter 212 includes a "DMA work queue state machine" that handles the updating of the control parameters for the DMA work queue 206 and determines the queue and slot into which each new DMA tuple should be inserted.

Figure 7B:
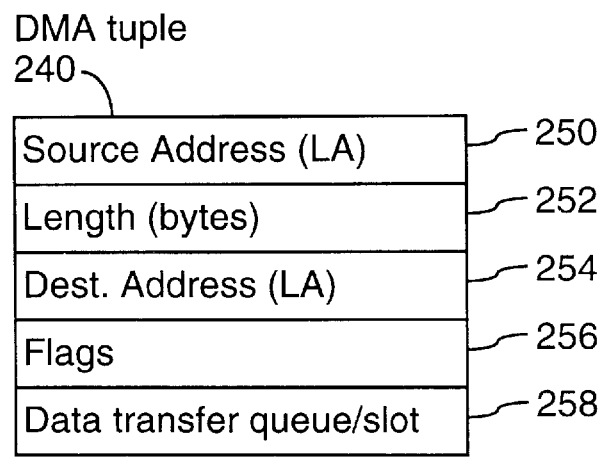

Referring to FIG. 7B, the DMA tuple 240 generated by the instruction receiver 190 for each received DMA instruction includes the following fields:

a source address 250, represented as a local physical address (PA) value;

a length value 252, indicating the number of bytes to be transferred;

a destination address 254, represented as a global address (GA) value;

a set of flags 256 that indicate operations to be performed in conjunction with the data transfer; and a data transfer queue pointer 258 indicating the slot in the data transfer queue 204 that has been assigned as a place holder for this DMA instruction.

Referring to FIG. 6, the PIO instructions in the data transfer queue 204 and the DMA instructions in the DMA work queue 206 are executed and packetized, with the resulting packets being stored in the Stage 2-S write FIFO for the I/O class associated with the PIO/DMA module, as follows. The packetizing engine 208 requests a data transfer tuple from the data transfer queue logic 228 whenever the write FIFO has room for at least one new packet and the data transfer queue is not empty.

If the next slot in the queue 204 to be processed contains a regular data transfer tuple, that tuple is passed to the packetizing engine and then the NPtr and #Slots control values 220, 226 for the queue are updated by the queue logic 228. The packetizing engine packetizes the data to be transferred, if any, and stores the resulting packet (if any) in the write FIFO.

If the next slot in the queue 204 to be processed contains a proxy DMA place holder, then the DMA instruction converter 212 is signaled to generate and transfer one data transfer tuple 223 to the packetizing engine 208 via the data transfer queue logic 228. The data transfer tuple generated by the DMA instruction converter 212 corresponds to the oldest pending DMA tuple 246 in the DMA work queue 206, which is pointed to by the DMA work queue's NPtr 244. The packetizing engine 208 continues to receive successive data transfer tuples 223 generated by the DMA instruction converter 212 from the oldest pending DMA tuple 246 until the entire data transfer associated with that DMA tuple has been packetized.

The generation of each data transfer tuple 223 from the oldest pending DMA tuple 246 takes several state machine cycles, and modifies the DMA tuple by incrementing the source address by one packet length and decrementing the length parameter by one packet length. The DMA instruction converter 212 repeats the DMA tuple to data transfer tuple conversion process until the length parameter in the DMA tuple is decremented to a value less than or equal to zero, at which point the DMA tuple 246 is deleted by updating the work queue pointer NPtr 244. When the DMA tuple 246 is deleted, the corresponding proxy DMA place holder in the data transfer queue 204 is also deleted by updating the data transfer queue pointer NPtr 220.

The packetizing engine 208 continues to convert the data transfer tuples (which correspond to PIO instructions) in the data transfer queue 204 and the DMA tuples in the DMA work queue 206 into packets so long as the write FIFO has room to receive additional packets.

As can be seen from the above discussion, DMA instructions are not implemented using conventional DMA transfer logic, but rather are converted by the network interface logic into an equivalent sequence of data transfer packets that are indistinguishable from the packets generated by PIO instructions as seen by Stage 2S. The CPU that issues the DMA instruction executes just one CPU store instruction to generate the memory mapped DMA instruction, after which the network interface handles the details of handling the actual data transfer specified by the memory mapped DMA instruction. As a result, the proxy DMA command of the present invention makes must more efficient use of the sending CPU than conventional DMA commands, which generally require 10 to 100 or so CPU instructions.

In the preferred embodiment, each data transfer tuple for a PIO_store_sender_notify command is converted by the packetizing engine 208 into a special "sender notification packet" that is stored in the corresponding Stage 2-S FIFO, but which is never transferred to Stage 3-S. When the packetizing engine encounters a data transfer tuple for a PIO_store_sender_notify command it takes a snapshot of all pending data transfer packets in the corresponding Stage 2-S FIFO (which were created by commands ahead the current command. Execution of the sender notification action is interlocked with the completion of those pending data transfer packets which are ahead of it. In one implementation, each time a packet is cleared from the Stage 2-S FIFO, if there are any pending sender notification packets, the snapshots in those pending sender notification packets are updated. When all the packet dependencies for a sender notification packet are cleared, the sender notification action specified by the packet is executed. In another implementation, each write FIFO maintains an "oldest pending packet pointer," in addition to the other FIFO pointers maintained by the FIFO logic. Whenever the clearing of a packet from the FIFO causes the "oldest pending packet pointer" to be updated to point to a sender notification packet, the sender notification action specified by the packet is executed.

One of the flags read from the OMMU for each transaction processed by the Stage 2-S state machine 162 is a "synch" flag. When the synch flag is set for a particular destination address, and the transaction is of the store type and thus assigned to a write FIFO, the command is said to have a synchronization requirement and execution of the command is delayed by the state machine until the transmission of all packets in the assigned write FIFO has been completed.

The packetizing engine 208 is temporarily stalled whenever it receives a data transfer tuple whose "synch flag" is set and there is at least one packet remaining in the Stage 2-S write FIFO for the I/O class associated with the PIO/DMA module. However, in the preferred embodiment, none of the PIO commands used in the message send functions discussed above require use of the synch flag. While the PIO_store_sender_notify command could be implemented using a synch flag, stalling the packetizing engine is not necessary for delaying the generation of a notification message until all previous packets in the corresponding write FIFO have been completed.

Alternate Embodiments

In an alternate embodiment, the two queues 204 and 206 in the PIO/DMA module could be merged into a single queue. In fact, the two queues 204 and 206 can be considered to a single queue since the PIO and DMA commands received by the PIO/DMA module are stored so as to maintain and execute those commands in the same order that they were generated.

In an alternate embodiment the I/O class for each PIO and DMA command could be determined by directly setting a few high order bits in the command's destination address, instead of using the OMMU lookup methodology of the preferred embodiment. Thus some of the high order bits of the destination address would be used to specify a memory mapped command, and others of the high order bits would be used to specify an I/O class.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of transmitting messages between nodes of a distributed computer system using a combination of memory mapped programmed I/O (PIO) commands and memory mapped DMA commands to transmit each of a subset of the messages, comprising steps of:

initiating the transmission of a multipart message from a first node to a second node of the distributed computer system by sending to a network interface of the first node a sequence of PIO store and DMA store commands, each PIO store and DMA store command specifying a respective component of the multipart message to be stored in a respective specified memory mapped location in the second node, the sequence of the PIO store and DMA store commands corresponding to a predefined message component order;

at the first node's network interface:

receiving the sequence of PIO and DMA commands corresponding to the multipart message;

storing each PIO and DMA command received by the first node's network interface in a queue, wherein the PIO and DMA commands are stored in the queue in a same order as they are received by the first node's network interface, which corresponds to the predefined message component order; and packetizing the PIO and DMA commands stored in the queue to generate an ordered stream of data transfer packets whose order corresponds to the predefined message component order, and transmitting the ordered stream of data transfer packets to the second node so as to store the respective components of the multipart message in their respective specified memory locations in the second node in a same order as the predefined message component order, the transmitting step preserving packet order within the ordered stream of data transfer packets.

2. The method of claim 1, wherein the sequence of PIO store and DMA store commands includes a sender notification command;

the first node's network interface stores the sender notification command in the queue PIO after storing in the queue any earlier PIO store and DMA store commands in the sequence; and the first node's network interface executes the sender notification command by sending a notification message to a specified memory location in the first node, only after processing of all PIO store and DMA store commands stored earlier in the queue has been completed by the first node's network interface.

3. The method of claim 2, wherein the step of sending each DMA store command to the network interface is performed by executing a single processor store instruction to a location that is memory mapped to the network interface.

4. The method of claim 2, wherein the step of sending each DMA store command to the network interface is performed by executing zero or more processor load instructions and a single processor store instruction to a location that is memory mapped to the network interface.

5. The method of claim 1, wherein the sequence of PIO store and DMA store commands includes a PIO store commit command that specifies a respective component of the multipart message to be stored in a respective specified memory mapped location in the second node, wherein the PIO store commit command requires an end-to-end acknowledgment from the second node after the respective message component has been stored in the respective specified memory mapped location in the second node;

the sequence of PIO store and DMA store commands includes at least one PIO or DMA store command that does not require an end-to-end acknowledgment from the second node after the respective message component has been stored in the respective specified memory mapped location in the second node;

the first node's network interface executes the PIO store commit command by: (A) generating a data transfer packet containing the respective message component and an end-to-end acknowledgment indicia, (B) transmitting the data transfer packet to the second node, and (C) waiting until the end-to-end acknowledgment from the second node is received before completing execution of the PIO store commit command.

6. A method of transmitting messages between nodes of a distributed computer system using a combination of memory mapped programmed I/O (PIO) commands and memory mapped DMA commands to transmit each of a subset of the messages, comprising steps of:

establishing a plurality of queues in the first node's network interface;

initiating the transmission of a multipart message from a first node to a second node of the distributed computer system by sending to a network interface of the first node a sequence of PIO store and DMA store commands, each PIO store and DMA store command specifying a respective component of the multipart message to be stored in a respective specified memory mapped location in the second node, the sequence of the PIO store and DMA store commands corresponding to a predefined message component order;

assigning each of the PIO store and DMA store commands that specify a respective component of the multipart message to a same one of the queues;

at the first node's network interface:

receiving the sequence of PIO and DMA commands corresponding to the multipart message;

storing each PIO and DMA command received by the first node's network interface in the assigned one of the queues, wherein the PIO and DMA commands stored in each queue are stored in a same order as they are received by the first node's network interface, which corresponds to the predefined message component order;

for each queue, packetizing the PIO and DMA commands therein so as to generate an ordered stream of data transfer packets whose order corresponds to the order in which the PIO and DMA commands are stored in the queue, and transmitting each of the ordered stream of data transfer packets to a destination node specified therein, the transmitting step preserving packet order within the ordered stream of data transfer packets, at least with respect to packets being transmitted to a same destination node, so as to store the respective components of the multipart message in their respective specified memory locations in the destination node in the predefined message component order.

7. The method of claim 6, including:

each DMA store command specifying a respective source address that is a local virtual address and a respective destination address that is a local physical address;

each PIO store command specifying a respective destination address that is a local physical address;

at the first node:

establishing an outgoing memory management unit (OMMU) and an incoming memory management unit (IMMU);

storing in the OMMU entries, each OMMU entry mapping a specified range of local physical addresses to a corresponding range of global address, each OMMU entry also specifying one of the queues in the first node's network interface in which to store PIO and DMA store commands whose destination address corresponds the range of local physical addressed mapped thereby;

storing in the IMMU entries, a first subset of the IMMU entries each mapping a specified range of global addresses to a corresponding range of local physical address, and a second subset of the IMMU entries each mapping a specified range of local virtual addresses to a corresponding range of local physical address;

at the first node's network interface:

for each received PIO store and DMA store command, locating an OMMU entry in the OMMU corresponding to the respective destination address specified therein, and converting the respective destination address in each received PIO store and DMA store command into a corresponding global address in accordance with the located OMMU entry;

for each received DMA store command, locating an IMMU entry in the IMMU corresponding to the respective source address specified therein, and converting the respective specified source address into a corresponding local physical address in accordance with the located IMMU entry;

wherein the packetizing step is performed after said converting steps so that each data transfer packet specifies a global destination address;

said packetizing step including, for each DMA store command, retrieving data from the local physical address produced by the converting step for the DMA store command.

8. A network interface for a first node of a distributed computer system, comprising:

receive logic for receiving a sequence of PIO store and DMA store commands, each PIO store and DMA store command specifying a respective component of a multipart message to be stored in a respective specified memory mapped location in a second node of the distributed computer system, the sequence of the PIO store and DMA store commands corresponding to a predefined message component order;

the receive logic including a queue for storing each of the received PIO and DMA commands, wherein the PIO and DMA commands are stored in the queue in a same order as they are received, which corresponds to the predefined message component order;

means, coupled to the receive logic, for packetizing the PIO and DMA commands stored in the queue to generate an ordered stream of data transfer packets whose order corresponds to the predefined message component order; and means, coupled to the packetizing means, for transmitting the ordered stream of data transfer packets to the second node so as to store the respective components of the multipart message in their respective specified memory locations in the second node in a same order as the predefined message component order; the transmitting means preserving packet order within the ordered stream of data transfer packets.

9. The network interface of claim 8, wherein the sequence of PIO store and DMA store commands includes a sender notification command;

the first node's network interface stores the sender notification command in the queue after storing in the queue any earlier PIO store and DMA store commands in the sequence; and the network interface includes state machine logic that executes the sender notification command by sending a notification message to a specified memory location in the first node, only after processing of all earlier PIO store and DMA store commands stored earlier in the queue has been completed.

10. The network interface of claim 8, wherein the sequence of PIO store and DMA store commands includes a PIO store commit command that specifies a respective component of the multipart message to be stored in a respective specified memory mapped location in the second node, wherein the PIO store commit command requires an end-to-end acknowledgment from the second node after the respective message component has been stored in the respective specified memory mapped location in the second node;

the sequence of PIO store and DMA store commands includes at least one PIO or DMA store command that does not require an end-to-end acknowledgment from the second node;

the packetizing means generates a data transfer packet for the PIO store commit command containing the respective message component and an end-to-end acknowledgment indicia; and the transmitting means transmits the data transfer packet for the PIO store commit command to the second node and waits until the end-to-end acknowledgment from the second node is received before completing execution of the PIO store commit command.

11. A network interface for a first node of a distributed computer system, comprising:

receive logic for receiving a sequence of PIO store and DMA store commands, each PIO store and DMA store command specifying a respective component of a multipart message to be stored in a respective specified memory mapped location in a second node of the distributed computer system, the sequence of the PIO store and DMA store commands corresponding to a predefined message component order;

the packetizing means including:

a plurality of queues;

classification logic for assigning each of the PIO store and DMA store commands that specify a respective component of the multipart message to a same one of the queues and for storing each PIO and DMA command received by the first node's network interface in the assigned one of the queues, wherein the PIO and DMA commands stored in each queue are stored in a same order as they are received by the first node's network interface, which corresponds to the predefined message component order; and packetizing logic, for each queue, for packetizing the PIO and DMA commands therein so as to generate an ordered stream of data transfer packets whose order corresponds to the order in which the PIO and DMA commands are stored in the queue;

the transmitting means including means for transmitting each of the ordered stream of data transfer packets to a destination node specified therein while preserving packet order within the ordered stream of data transfer packets at least with respect to packets being transmitted to a same destination node.

12. The network interface of claim 11, wherein:

each DMA store command specifies a respective source address that is a local virtual address and a respective destination address that is a local physical address;

each PIO store command specifies a respective destination address that is a local physical address;

the network interface includes an outgoing memory management unit (OMMU) and an incoming memory management unit (IMMU), the OMMU storing a plurality of OMMU entries, each OMMU entry mapping a specified range of local physical addresses to a corresponding range of global address, each OMMU entry also specifying one of the queues in the first node's network interface in which to store PIO and DMA store commands whose destination address corresponds the range of local physical addressed mapped thereby;

the IMMU storing a plurality of IMMU entries, a first subset of the IMMU entries each mapping a specified range of global addresses to a corresponding range of local physical address, and a second subset of the IMMU entries each mapping a specified range of local virtual addresses to a corresponding range of local physical address;

the first node's network interface includes:
  OMMU lookup logic for locating, for each received PIO store and DMA store command, an OMMU entry in the OMMU corresponding to the respective destination address specified therein, and converting the respective destination address in each received PIO store and DMA store command into a corresponding global address in accordance with the located OMMU entry;
  IMMU lookup logic for locating, for each received DMA store command, an IMMU entry in the IMMU corresponding to the respective source address specified therein, and converting the respective specified source address into a corresponding local physical address in accordance with the located IMMU entry;
  the packetizing logic stores in each generated data transfer packet a global destination address corresponding to a global address obtained by the OMMU lookup logic; and
  the packetizing logic, when packetizing each DMA store command, retrieves data from the local physical address obtained by the IMMU lookup logic for the source address specified by the DMA store command.

13. A network interface for a first node of a distributed computer system, comprising:
  receive logic for receiving a sequence of PIO store and DMA store commands, each PIO store and DMA store command specifying a respective component of a multipart message to be stored in a respective specified memory mapped location in a second node of the distributed computer system, the sequence of the PIO store and DMA store commands corresponding to a predefined message component order;
  the receive logic including a queue for storing each of the received PIO and DMA commands, wherein the PIO and DMA commands are stored in the queue in a same order as they are received, which corresponds to the predefined message component order;
  command processing circuitry, coupled to the receive logic, for packetizing the sequence of PIO and DMA commands stored in the queue to generate an ordered stream of data transfer packets whose order corresponds to the predefined message component order; and
  packet handling circuitry, coupled to the command processing circuit, for transmitting the ordered stream of data transfer packets to the second node so as to store the respective components of the multipart message in their respective specified memory locations in the second node in the predefined message component order; the packet handling circuitry preserving packet order within the transmitted ordered stream of data transfer packets.

14. A network interface for a first node of a distributed computer system, comprising:
  receive logic for receiving a sequence of PIO store and DMA store commands, each PIO store and DMA store command specifying a respective component of a multipart message to be stored in a respective specified memory mapped location in a second node of the distributed computer system, the sequence of the PIO store and DMA store commands corresponding to a predefined message component order;
  command processing circuitry, coupled to the receive logic, including:
    a plurality of queues;
    classification logic for assigning each of the PIO store and DMA store commands that specify a respective component of the multipart message to a same one of the queues and for storing each PIO and DMA command received by the first node's network interface in the assigned one of the queues, wherein the PIO and DMA commands stored in each queue are stored in a same order as they are received by the first node's network interface, which corresponds to the predefined message component order; and
    a packetizing engine, for each queue, for packetizing the PIO and DMA commands therein so as to generate an ordered stream of data transfer packets whose order corresponds to the order in which the PIO and DMA commands are stored in the queue; and
  packet handling circuitry, coupled to the each of the queues in the command processing circuitry, including a scheduler for scheduling transmission of the ordered stream of data transfer packets in each queue to the destination nodes specified therein while preserving packet order within each queue's ordered stream of data transfer packets, at least with respect to packets being transmitted to a same destination node, so as to store the respective components of the multipart message in their respective specified memory locations in the destination node in the predefined message component order.

15. The network interface of claim 14, wherein:
  each DMA store command specifies a respective source address that is a local virtual address and a respective destination address that is a local physical address;
  each PIO store command specifies a respective destination address that is a local physical address;
  the network interface includes an outgoing memory management unit (OMMU) and an incoming memory management unit (IMMU), the OMMU storing a plurality of OMMU entries, each OMMU entry mapping a specified range of local physical addresses to a corresponding range of global address, each OMMU entry also specifying one of the queues in the first node's network interface in which to store PIO and DMA store commands whose destination address corresponds the range of local physical addressed mapped thereby;
  the IMMU storing a plurality of IMMU entries, a first subset of the IMMU entries each mapping a specified range of global addresses to a corresponding range of local physical address, and a second subset of the IMMU entries each mapping a specified range of local virtual addresses to a corresponding range of local physical address;

the first node's network interface includes:

OMMU lookup logic for locating, for each received PIO store and DMA store command, an OMMU entry in the OMMU corresponding to the respective destination address specified therein, and converting the respective destination address in each received PIO store and DMA store command into a corresponding global address in accordance with the located OMMU entry;

IMMU lookup logic for locating, for each received DMA store command, an IMMU entry in the IMMU corresponding to the respective source address specified therein, and converting the respective specified source address into a corresponding local physical address in accordance with the located IMMU entry;

the packetizing engine for each queue stores in each generated data transfer packet a global destination address corresponding to a global address obtained by the OMMU lookup logic; and the packetizing engine for each queue, when packetizing each DMA store command, retrieves data from the local physical address obtained by the IMMU lookup logic for the source address specified by the DMA store command.

* * * * *